(12) United States Patent
Dymond et al.

(10) Patent No.: US 10,089,483 B2
(45) Date of Patent: Oct. 2, 2018

(54) CONTROLLING ENABLEMENT OF RESOURCES

(71) Applicant: Metaswitch Networks Limited, Enfield, Middlesex (GB)

(72) Inventors: Max Dymond, Middlesex (GB); Colin Michael Treganza Dancer, Middlesex (GB)

(73) Assignee: Metaswitch Networks Limited, Enfield, Middlesex (GB)

( * ) Notice: Subject to any disclaimer, the term of this patent is extended or adjusted under 35 U.S.C. 154(b) by 593 days.

(21) Appl. No.: 14/557,856

(22) Filed: Dec. 2, 2014

(65) Prior Publication Data

US 2016/0134555 A1    May 12, 2016

(30) Foreign Application Priority Data

Nov. 6, 2014   (GB) .................................. 1419793.3

(51) Int. Cl.
| | |
|---|---|
| *G06Q 30/06* | (2012.01) |
| *H04L 12/24* | (2006.01) |
| *H04L 29/08* | (2006.01) |
| *G06F 21/62* | (2013.01) |
| *H04L 29/06* | (2006.01) |
| *G06F 9/50* | (2006.01) |
| *H04L 12/819* | (2013.01) |
| *H04L 12/923* | (2013.01) |

(52) U.S. Cl.
CPC ........ *G06F 21/6218* (2013.01); *H04L 63/102* (2013.01); *G06F 9/5005* (2013.01); *G06F 2221/2137* (2013.01); *H04L 41/08* (2013.01); *H04L 47/215* (2013.01); *H04L 47/762* (2013.01)

(58) Field of Classification Search
CPC ....... H04L 63/10; H04L 41/08; H04L 47/762; H04L 67/00; H04L 47/125; H04W 12/08; H04W 28/02; H04W 12/06; H04W 52/343
See application file for complete search history.

(56) References Cited

U.S. PATENT DOCUMENTS

| | | | |
|---|---|---|---|
| 8,543,830 B1 * | 9/2013 | Khattar | ................. G06F 21/445 |
| | | | 713/185 |
| 8,555,336 B1 | 10/2013 | Dhesi et al. | |
| 9,130,753 B1 * | 9/2015 | Kronrod | .................. H04L 9/30 |
| | | (Continued) | |

FOREIGN PATENT DOCUMENTS

| | | |
|---|---|---|
| JP | 2012091686 | 5/2012 |
| WO | WO2011022752 | 3/2011 |

*Primary Examiner* — Nicholas R Taylor
*Assistant Examiner* — Ho T Shiu
(74) *Attorney, Agent, or Firm* — Stetina Brunda Garred & Brucker

(57) ABSTRACT

The application relates to systems, devices and methods for controlling enablement of resources based on a number of tokens in a token store. A resource is enabled when a number of tokens in the token store is greater than a minimum value. The resource is disabled when the number of tokens in the token store is not greater than the minimum value. When used in combination with an authorisation source, such as an authorisation source stored on a server or storage means, the token store provides a grace period during which the resource is enabled, even if the authorisation source is unavailable due to network or hardware failure, or disconnection of the storage means, for example.

19 Claims, 11 Drawing Sheets

(56) References Cited

U.S. PATENT DOCUMENTS

| | | | | |
|---|---|---|---|---|
| 2003/0088780 A1* | 5/2003 | Kuo | ................ | G06F 21/6218 |
| | | | | 713/185 |
| 2007/0033205 A1* | 2/2007 | Pradhan | ................ | G06F 9/5061 |
| 2010/0023523 A1* | 1/2010 | Chung | ................ | G06F 21/62 |
| | | | | 707/E17.005 |
| 2014/0123156 A1 | 5/2014 | Schillings et al. | | |
| 2014/0223516 A1* | 8/2014 | Vongsouvanh | ..... | H04L 63/0492 |
| | | | | 726/4 |
| 2014/0379506 A1* | 12/2014 | Marshall | ................ | H04L 47/12 |
| | | | | 705/26.1 |
| 2016/0344651 A1* | 11/2016 | Kusters | ................ | H04L 67/146 |

* cited by examiner

| time t | token store 3 | token store 4 |
|---|---|---|
| 0 | 10 | 10 |
| 1 | 10 | 8 |
| 2 | 10 | 6 |
| 3 | 10 | 4 |
| 4 | 10 | 2 |
| 5 | 8 | 3 |
| 6 | 6 | 4 |
| 7 | 4 | 5 |
| 8 | 2 | 6 |
| 9 | 3 | 4 |
| 10 | 4 | 2 |
| 11 | 2 | 3 |
| 12 | 3 | 1 |
| 13 | 1 | 2 |
| 14 | 0 | 3 |

Figure 3

| time t | token store 13 | token store 23 | token store 33 |
|---|---|---|---|
| 10 | 10 | 10 | 10 |
| 11 | 10 | 10 | 8 |
| 12 | 10 | 10 | 6 |
| 13 | 10 | 10 | 4 |
| 14 | 10 | 10 | 2 |
| 15 | 10 | 8 | 3 |
| 16 | 10 | 6 | 4 |
| 17 | 10 | 4 | 5 |
| 18 | 10 | 2 | 6 |
| 19 | 8 | 0 | 4 |
| 20 | 6 | 0 | 2 |
| 21 | 4 | 0 | 0 |
| 22 | 2 | 0 | 0 |
| 23 | 0 | 0 | 0 |

Figure 10

CONTROLLING ENABLEMENT OF RESOURCES

CROSS REFERENCE TO RELATED APPLICATIONS

The present application claims priority to UK Patent Application No. 1419793.3 filed Nov. 6, 2014, the entirety of the disclosure of which is expressly incorporated herein by reference.

STATEMENT RE: FEDERALLY SPONSORED RESEARCH/DEVELOPMENT

Not Applicable.

BACKGROUND OF THE INVENTION

Some conventional methods for controlling enablement of resources rely on a locally-stored electronic file which indicates whether or not a resource (such as a software application which a user wishes to execute on an apparatus) is enabled or disabled.

Such methods can be inflexible, in that it is often not possible to move the electronic file to a second apparatus to enable a resource from the second apparatus instead of the first apparatus. In some such circumstances, the electronic file is duplicated and used to enable resources on both the first apparatus and the second apparatus simultaneously. This simultaneous enablement may be an illegitimate use of the electronic file. The electronic file may have been intended to allow enablement of only one resource on only one apparatus.

Other conventional methods for controlling enablement of resources rely on an electronic file stored remotely from an apparatus on a physical device, e.g. a storage means such as a USB drive. In this case, the resource is only enabled while the physical storage means is connected to the apparatus. Once the connection between the physical device and the apparatus has been severed, the resource is disabled. This is inconvenient in circumstances where the physical device needs to be temporarily disconnected from the apparatus, as the resource will be disabled during the period of disconnection.

The present invention aims to overcome or at least ameliorate at least some of the problems set out above.

SUMMARY OF THE INVENTION

According to the present invention there is provided a system for controlling enablement of one or more resources, comprising: at least one control device; and at least one token store for storing a number of tokens, wherein the number of tokens in the at least one token store can range between a minimum value and a maximum value; and wherein: the control device is arranged to enable one or more resources when the number of tokens in the token store is greater than the minimum value and to disable the one or more resources when the number of tokens in the token store is not greater than the minimum value; the number of tokens in the token store increases over time, up to the maximum value, while a criterion is satisfied; and the number of tokens in the token store decreases over time, down to the minimum value, while the criterion is not satisfied.

Such a system allows a control device to control enablement of one or more resources based on a number of tokens in a token store. This means that the resource(s) can continue to be enabled as long as the number of tokens in the token store remains greater than the minimum value. In particular this allows a control device to allow more than one resource to be enabled in the short term, even though in the longer term, it is desired that only one the resources is to be enabled.

Preferably, the number of tokens in the token store increases at a rate of M tokens per unit time while the criterion is satisfied, the number of tokens in the token store decreases at a rate of N tokens per unit time while the criterion is not satisfied, and the rate N is greater in magnitude than the rate M. In this way, the resource cannot be enabled indefinitely without satisfying the criterion for sufficient time to keep the number of tokens in the token store above the minimum value.

Preferably, the criterion is satisfied when there is an exclusive connection to an authorisation source from the control device and the criterion is not satisfied when there is no exclusive connection to an authorisation source from the control device. This prevents prolonged enablement of resources by a number of control devices without a matching number of exclusive connections to authorisation sources. Here, the number of tokens between the control devices' token stores will diminish over time unless each of the control devices maintains an exclusive connection to an authorisation source.

Preferably, the authorisation source is provided on at least one of: a physical storage means which can be physically connected to the control device, and a server to which the control device can connect over a network. This allows a single authorisation source to serve different control devices at different times. In the case of a physical storage means, it can be physically moved allowing the existing resource being enabled to continue to operate whilst provisionally enabling a new resource. Similarly, for a server based authorisation source, the new resource can be enabled simultaneously with an existing resource for a limited period.

Optionally, the system comprises a plurality of control devices. This allows the system to control enablement of resources using the plurality of control devices, for example, with each control device controlling enablement of one or more resources.

At any given time, the plurality of control devices may be selectively divided into one or more subsets, each subset including at least one device. This allows the system to control the plurality of control devices based on the number (s) of devices in the subset(s) of devices.

The at least one token store may be a collective token store associated with one of the one or more subsets and each control device in the subset may be arranged to enable a respective resource when the number of tokens in the collective token store is greater than the minimum value and not to enable the respective resource when the number of tokens in the collective token store is not greater than the minimum value. This means that the ability of multiple control devices to enable resources can be controlled using only a single collective token store.

Optionally, each control device has an associated token store and each control device is arranged to enable a respective resource when the number of tokens in the control device's associated token store is greater than the token store's minimum value and not to enable the respective resource when the number of tokens in the control device's associated token store is not greater than the token store's minimum value. This means that the ability of multiple control devices to enable resources can be controlled on a device-by-device basis.

Optionally, each control device is arranged to enable the respective resource when the number of tokens in an associated token store is not greater than the minimum value but the number of tokens in a token store associated with another device in the same subset is greater than the minimum value for that other token store. This allows sharing of enablement capacity between devices.

Preferably, the criterion is satisfied for a control device when that control device belongs to a subset including more than half of the control devices in the plurality, and the criterion is not satisfied for a control device when that control device belongs to a subset including half or fewer than half of the control devices in the plurality. This allows numbers of tokens in token stores to be controlled based on numbers of devices which are connected to one another rather than on exclusive connections to authorisation sources.

The devices in a subset may be only connected to one another but not to devices in other subsets.

The present invention also provides a method for controlling enablement of one or more resources, comprising: enabling one or more resources when a number of tokens in a token store, for storing a number of tokens, is greater than a minimum value for the token store and disabling the one or more resources when the number of tokens in the token store is not greater than the minimum value; increasing the number of tokens in the token store over time, up to a maximum value for the token store, while a criterion is satisfied; and decreasing the number of tokens in the token store over time, down to the minimum value, while the criterion is not satisfied.

Preferably, the method includes increasing the number of tokens in the token store at a rate of M tokens per unit time while the criterion is satisfied, and decreasing the number of tokens in the token store at a rate of N tokens per unit time while the criterion is not satisfied, wherein the rate N is greater in magnitude than the rate M.

Preferably, the criterion is satisfied when there is an exclusive connection to an authorisation source from a control device. The criterion is not satisfied when there is no exclusive connection to an authorisation source from the control device.

The method may further include connecting to the authorisation source, the authorisation source being provided on at least one of: a physical storage means which can be physically connected to the control device, and a server to which the control device can connect over a network.

The present invention may also provide a plurality of instances of the above method, wherein each instance is operated on a control device for controlling multiple resources.

Preferably, the method includes the plurality of control devices being selectively divided into one or more subsets, each subset including at least one control device.

Optionally, the token store is a collective token store associated with one of the one or more subsets, and each control device in the subset enables a respective resource when the number of tokens in the collective token store is greater than the minimum value and does not enable the respective resource when the number of tokens in the collective token store is not greater than the minimum value.

Optionally, each control device has an associated token store and each control device enables a respective resource when the number of tokens in the control device's associated token store is greater than the token store's minimum value and does not enable the respective resource when the number of tokens in the control device's associated token store is not greater than the token store's minimum value.

Each control device may enable the respective resource when the number of tokens in its associated token store is not greater than the minimum value but the number of tokens in a token store associated with another control device in the same subset is greater than the minimum value for that other token store.

Preferably, the criterion is satisfied for a control device when that control device belongs to a subset including more than half of the control devices in the plurality, and the criterion is not satisfied for a control device when that control device belongs to a subset including half or fewer than half of the control devices in the plurality.

The control devices in a subset may be connected to one another but not to control devices in other subsets.

The present invention further provides a computer program product directly loadable into the internal memory of a digital computer, comprising software code portions for performing the methods described above when said product is run on a computer.

BRIEF DESCRIPTION OF THE DRAWINGS

Specific embodiments of the invention will now be described by way of non-limiting examples, in which:

FIG. 3 illustrates numbers of tokens in token stores over a time period in the embodiment of FIG. 2;

FIG. 10 illustrates numbers of tokens in token stores over a time period in the embodiment of FIGS. 6-9.

DETAILED DESCRIPTION

Figure 1:
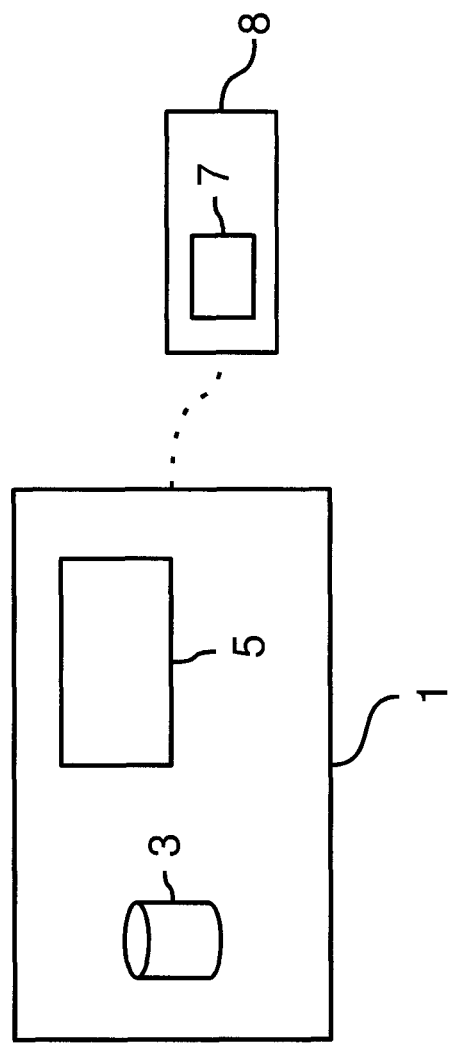
FIG. 1 illustrates an embodiment of a system for controlling enablement of a resource by a single device.

FIG. 1 illustrates a system for controlling enablement of a resource. The figure illustrates control device 1, token store 3, resource 5, and authorisation source 7 provided on removable USB drive 8. Resource 5 could be any resource which may provide some kind of functionality or service and which can be controlled by control device 1 to operate or not (or operate in a restricted way). This allows the device 1 to restrict operation or function of the resource, if required. The resource may be a machine, the operation of which is to be restricted or a processor or device running software which may be enabled (such as according to a license) or not.

Token store 3, for storing a number of tokens, is provided in software on control device 1. The number of tokens in token store 3 can range between a minimum value of 0 tokens and a maximum value of 10 tokens.

Control device 1 enables resource 5 when the number of tokens in token store 3 is greater than 0. Control device 1 disables resource 5 when the number of tokens in token store 3 is not greater than 0. In this example, resource 5 is a software application which is stored on control device 1. The software application can be used only when control device 1 enables the resource, i.e. when the number of tokens in the token store 3 is greater than 0.

At time t=0, there are 10 tokens in token store 3, and USB drive 8 is not connected to control device 1 (the dashed line in FIG. 1 indicates that USB drive 8 is connectable to and removable from control device 1). While USB drive 8 is not connected to control device 1, the number of tokens in token store 3 decreases over time at a rate N of 2 tokens per unit time, down to the minimum value.

Between the times of t=0 and t=4, the number of tokens in token store 3 decreases, at the rate N of 2 tokens per unit time, from 10 tokens down to 2 tokens. Control device 1 still enables resource 5 at time t=4, as the number of tokens in token store 3 is greater than the minimum value of 0. However, between time t=4 and time t=5, the number of tokens in token store 3 decreases by 2 tokens to 0 tokens. Therefore, from time t=5 onwards, control device 1 disables resource 5. The number of tokens in token store 3 remains at the minimum value of 0.

At time t=10, removable USB drive 8 is connected to control device 1. Connecting removable USB drive 8 to control device 1 establishes an exclusive connection from control device 1 to authorisation source 7. The connection is 'exclusive' in that no other devices or users are able to connect to (or be authorised by) authorisation source 7 while control device 1 is connected to authorisation source 7.

While removable USB drive 8 is connected to control device 1, the number of tokens in token store 3 increases over time at a rate M of 1 token per unit time, stopping if it reaches the maximum value. Therefore, between time t=10 and time t=15, the number of tokens in token store 3 increases by 1 token each unit of time, from 0 tokens to 5 tokens. As soon as the number of tokens in token store 3 is greater than 0 tokens, device 1 enables resource 5.

If USB drive 8 is left connected to the control device until time t=20, the token store 3 will reach its maximum value of 10 tokens, by increasing at the rate of 1 token per unit time. From time t=20 onwards, the number of tokens in the token store 3 will stay at the maximum value until USB drive 8 is removed. Therefore, a continuing exclusive connection to an authorisation source means that a control device can continue enabling a resource indefinitely.

A system with a token store provides a grace period during which a control device can enable a resource even while there is no exclusive connection to an authorisation source. Such a grace period provides a user with the ability to remove a USB drive (providing an authorisation source) from a control device briefly without disabling a resource. This is useful in numerous circumstances, such as if the user is rearranging, restarting or upgrading hardware or software. This means that where temporary disconnection or unmounting of the USB drive is necessary, it can be done without disabling the resource, which would clearly be inconvenient. It also prevents instantaneous disablement of the resource in the event of accidental removal of the USB drive.

However, the system also prevents users from exploiting the grace period provided by the token store, as explained in more detail below.

Figure 2:
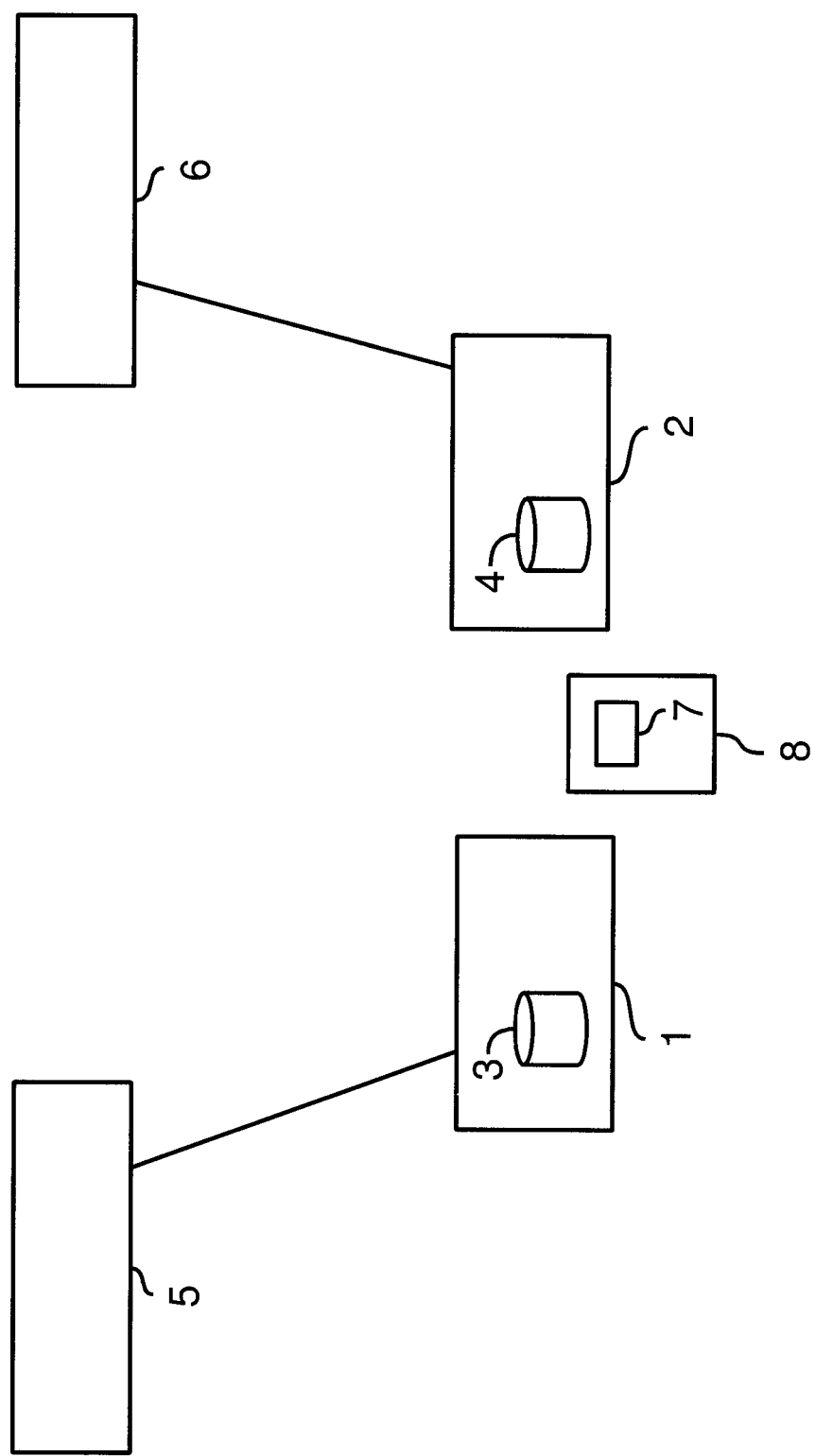
FIG. 2 illustrates an embodiment of a system for controlling enablement of multiple resources by multiple devices.

FIG. 2 illustrates an arrangement including a first control device 1 with an associated token store 3 and a resource 5 of which control device 1 controls enablement, and a second control device 2 with an associated token store 4 and a resource 6 of which control device 2 controls enablement. In this example, resources 5 and 6 are hardware resources located externally to the devices 1 and 2.

Each of the token stores 3, 4 has a minimum value of 0 tokens and a maximum value of 10 tokens. The number of tokens in a token store will increase over time at a rate M of 1 token per unit time while there is an exclusive connection to an authorisation source, until it reaches the maximum value of 10 tokens. The number of tokens in a token store will decrease over time at a rate N of 2 tokens per unit time while there is no exclusive connection to an authorisation source, until it reaches the minimum value of 0 tokens.

A user attempts to use one authorisation source 7 on USB drive 8 to enable two resources 5 and 6 simultaneously and continuously, by swapping USB drive 8 between devices 1 and 2. FIG. 3 illustrates the numbers of tokens in token stores 3 and 4 over the time period t=0 to t=14.

At time t=0, token stores 3 and 4 contain the maximum value of 10 tokens each. There are therefore 20 tokens in total between the two stores at time t=0. Device 1 enables resource 5, and device 2 enables resource 6, since each token store contains more than 0 tokens. USB drive 8 is connected to control device 1, so there is an exclusive connection from device 1 to authorisation source 7. There is no exclusive connection from device 2 to an authorisation source.

Between time t=0 and time t=4, the number of tokens in token store 3 remains at the maximum value of 10 because of the exclusive connection from device 1 to authorisation source 7. In the same time period, the number of tokens in token store 4 decreases by 2 tokens per unit time (e.g. second) from 10 tokens to 2 tokens, because there is no exclusive connection from device 2 to an authorisation source. There are therefore 12 tokens in total between the two stores at time t=4.

Devices 1 and 2 continue to enable resources 5 and 6, respectively, throughout the period, because each token store 3, 4 contains more than 0 tokens. At time t=4, the user removes USB drive 8 from control device 1 and connects the USB drive to control device 2, thus breaking the exclusive connection from control device 1 to authorisation source 7 and establishing an exclusive connection from control device 2 to authorisation source 7.

Between time t=4 and time t=8, the number of tokens in token store 3 decreases by 2 tokens each second from 10 tokens to 2 tokens, because there is no exclusive connection from device 1 to an authorisation source. The number of tokens in token store 4 increases by 1 token each second from 2 tokens to 6 tokens, because of the exclusive connection from device 2 to authorisation source 7. There are therefore 8 tokens in total between the two stores at time t=8.

Devices 1 and 2 continue to enable resources 5 and 6, respectively, throughout the period, because each token store 3, 4 still contains more than 0 tokens. At time t=8, the user removes USB drive 8 from control device 2 and connects the USB drive to control device 1, breaking the exclusive connection from control device 2 to authorisation source 7 and establishing an exclusive connection from control device 1 to authorisation source 7.

Between time t=8 and time t=10, the number of tokens in token store 3 increases by 1 token each second from 2 tokens to 4 tokens, because of the exclusive connection from device 1 to authorisation source 7. The number of tokens in token store 4 decreases by 2 tokens each second from 6 tokens to 2 tokens, because there is no exclusive connection from device 2 to an authorisation source. There are therefore 6 tokens in total between the two stores at time t=10. Devices 1 and 2 continue to enable resources 5 and 6 throughout the time period, because each token store contains more than 0 tokens. At time t=10, the user removes USB drive 8 from control device 1 and connects the USB drive to control device 2.

Between time t=10 and time t=11, the number of tokens in token store 3 decreases by 2 tokens from 4 tokens to 2 tokens, because there is no exclusive connection from device 1 to an authorisation source. The number of tokens in token store 4 increases by 1 token from 2 tokens to 3 tokens, because of the exclusive connection from device 2 to authorisation source 7. To prevent token store 3 reaching zero at t=12, the USB drive would need to be moved again to control device 1.

Device 2 still enables resource 6 at time t=12, because the number of tokens in store 4 is 3, i.e. greater than 0. Device 1 also still enables resource 5 at time t=12, because the number of tokens in store 3 is 1, i.e. greater than 0. To prevent token store 4 running out, the USB drive would need to be moved again from control device 1 and connects the USB drive to control device 2.

Between time t=12 and time t=13, the number of tokens in token store 3 decreases by 2 tokens from 3 tokens to 1 token, because there is no exclusive connection from device 1 to an authorisation source. The number of tokens in store 4 increases by 1 token from 1 token to 2 tokens, because of the exclusive connection from device 2 to authorisation source 7. There are therefore only 3 tokens in total between the two stores.

At this stage, if the USB drive is left connected to control device 2, at t=14, the number of tokens in store 4 will increase to 3 allowing device 2 to still enable resource 6. However, the number of tokens in store 3 will fall to 0 and so device 1 will no longer enable resource 5. Even if the USB drive was swapped from control device 2 to control device 1, at t=14, the number of tokens in token store 4 will fall to zero and so device 2 will no longer enable resource 6.

In other words, after t=13, it is no longer possible to keep both resource 5 and resource 6 enabled by moving the USB drive back and forth between them and one of them will inevitably be disabled.

In the example of FIG. 2, the rate N of token decrease per unit time (2 tokens per second) is greater in magnitude than the rate M of token increase per unit time (1 token per second) by 1 token per second. This ensures that wherever the USB drive is placed, the total number of tokens in the system (i.e. in stores 3 and 4) decreases over time and therefore prevents prolonged use of one authorisation source to enable two resources.

In other scenarios, there may be additional constraints on rates N and M depending on such system parameters as: the number of devices in the system; the number of token stores in the system; the numbers of tokens in each of the token stores at a given time; and the number of resources in the system, for example. Choosing appropriate maximum and minimum values for tokens stores and appropriate rates M, N of token increase and decrease allows the above method to be configured for systems comprising other numbers of token stores, other numbers of authorisation sources, and other numbers of resources. This allows the system to respond differently in different circumstances.

Figure 4:
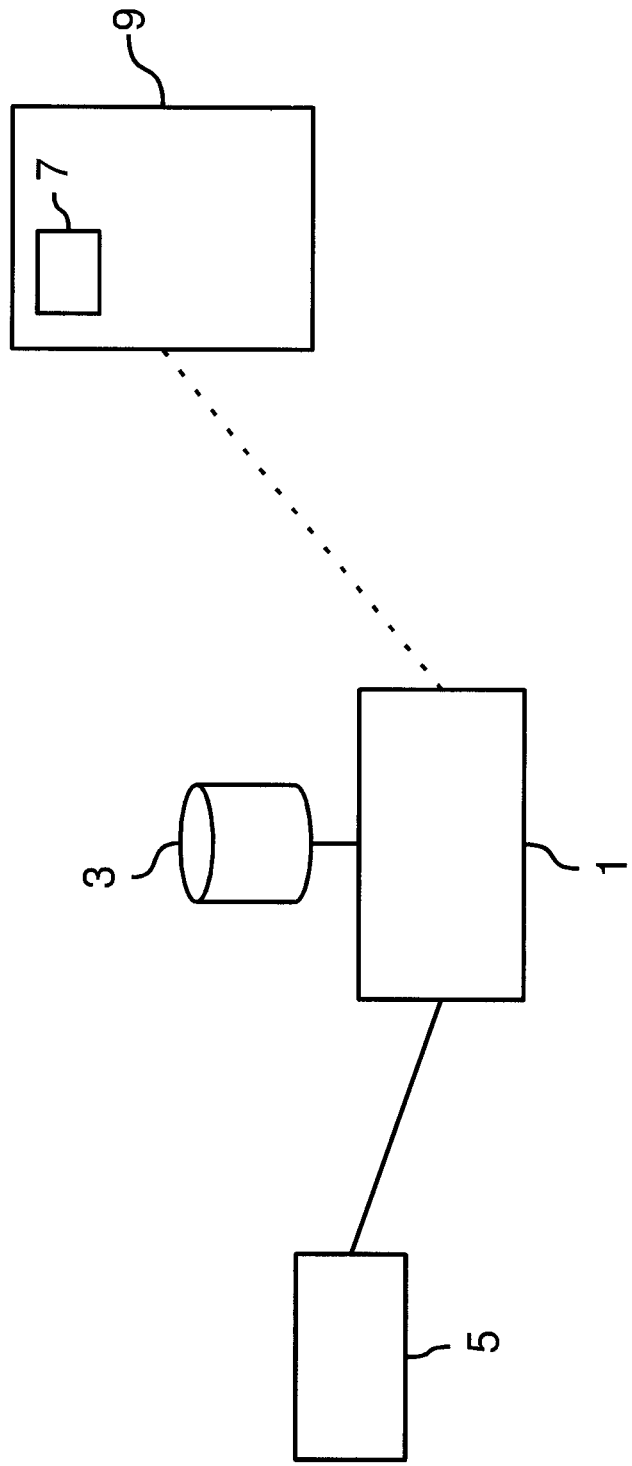
FIG. 4 illustrates an alternative embodiment of a system for controlling enablement of a resource by a single device.

FIG. 4 illustrates an alternative embodiment in which device 1 connects (e.g. over a wired or wireless network) to a server 9 at which authorisation source 7 is stored. In this example, authorisation source 7 is an Amazon S3 secure object stored at the server 9, and the connection is established using a uniform resource locator ('URL'), a uniform resource indicator ('URI') or other means of identifying an authorisation source at a server. In other examples, authorisation source 7 may be some other suitable 'virtual' object stored at a server, such as a Microsoft Azure object, a Google Cloud object, or other type of secure object stored at a remote server.

The server and secure object are arranged so that only one device is able to establish an exclusive connection to the secure object at any given time. This may be effected in various ways, such as by preventing a device from connecting to the secure object while another device is connected to the secure object, or by severing an existing connection between a first device and the secure object when a second device attempts to connect to the secure object, for example. There may be a 'cooling off' period following an attempt by two devices at simultaneous connection to the secure object during which no exclusive connection may be established.

This system can provide similar functionality to the USB based system above. With this, a first device 1 can seek authorisation from the secure object 7. If it can establish an exclusive connection, then it will refill token store 3 with M tokens. At the same time, a second device 2 may seek to establish an exclusive connection to secure object 7. If it is denied, its own token store 4 will be depleted by N tokens. If it can establish an exclusive connection, then device 1 will be displaced and device 1 will reduce the tokens in store 3 by N tokens, whilst device 2 adds M tokens to its token store 4. It will be apparent that this operation is equivalent to the USB example above but instead of a USB drive being physically moved from device to device, the exclusive connection would have to be moved from device to device.

Figure 5:
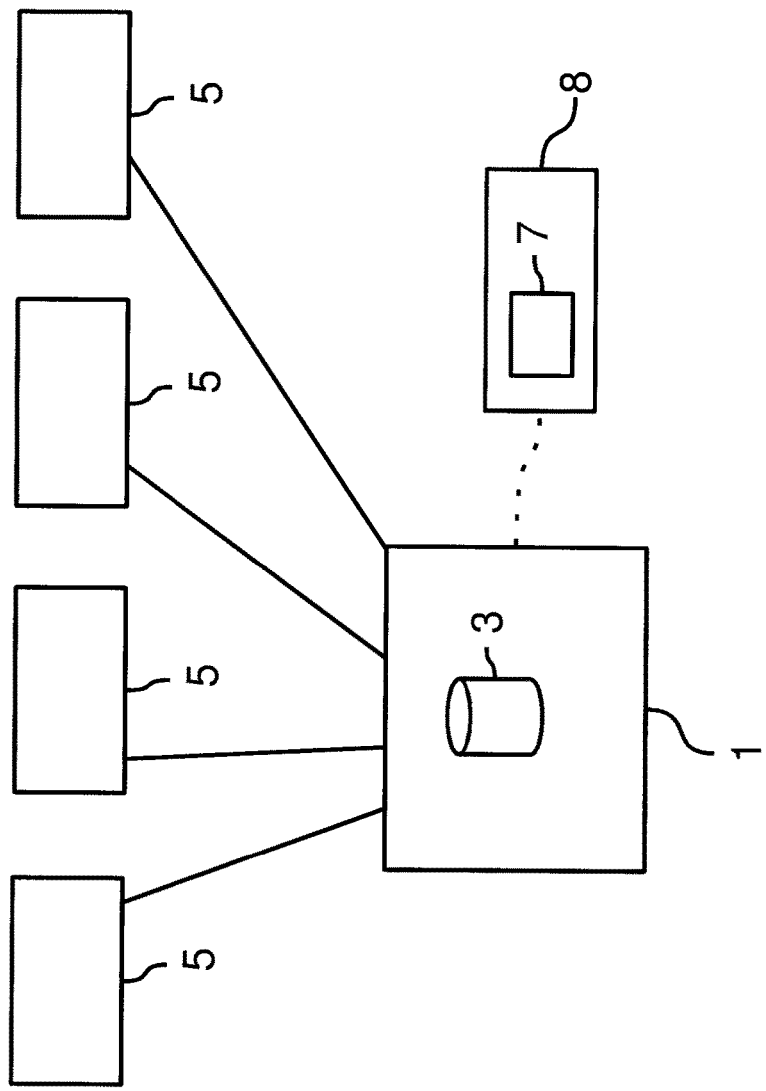
FIG. 5 illustrates an embodiment of a system for controlling multiple resources by a single device.

FIG. 5 illustrates a system in which device 1 controls enablement of a plurality of hardware resources 5 located externally to device 1. In this context, device 1 enables all of the resources 5 while the number of tokens in token store 3 is greater than 0, and disables all of the resources 5 while the number of tokens in store 3 is not greater than 0.

Figure 6:
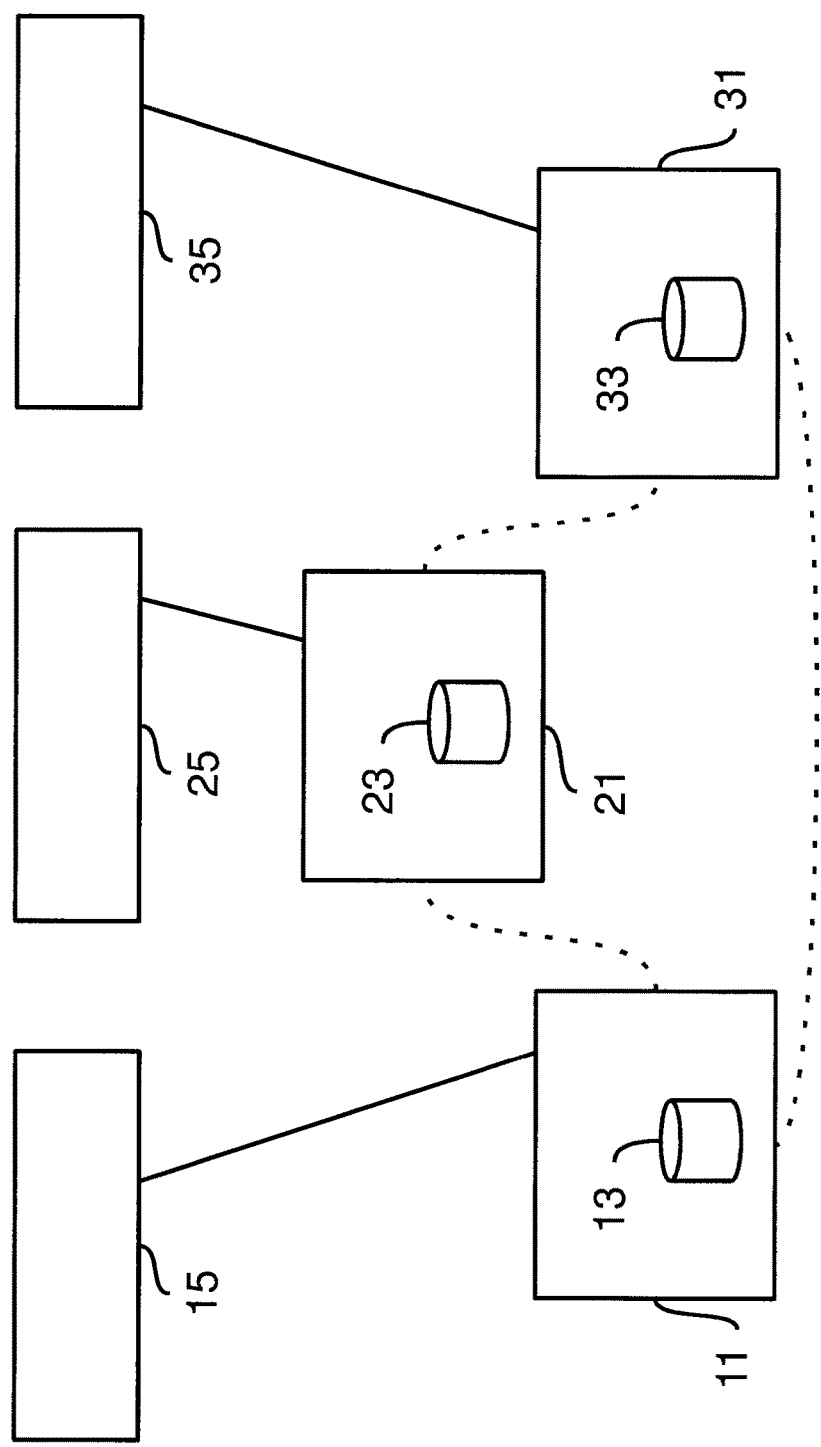
FIG. 6 illustrates an embodiment of a system comprising a plurality of network-connectable devices for controlling enablement of resources.

FIG. 6 illustrates a system comprising a plurality of control devices 11, 21, 31. Each control device has an associated token store 13, 23, 33 and a respective resource 15, 25, 35 of which the device controls enablement (as indicated by the solid lines in the figure).

Devices 11, 21, 31 can be connected to one another, e.g. over a network. Dashed lines are used in the figure to indicate network connections between devices. It is important to note that the network connections between the devices are not necessarily permanent—the network connections may be severed and reinstated at a later time, as discussed in detail below and illustrated in FIGS. 7, 8 and 9.

At any given time, the plurality of control devices is selectively divided into one or more subsets, each subset including at least one device. The subsets are defined by network connections between devices: devices which are connected to one another belong to the same subset. Therefore, multiple subsets can exist when at least one device is disconnected from the other devices in the plurality.

So for example, if there are 10 devices in a system and 3 become separated by a network issue such that the 3 are still connected to each other but not the other 7 and the 7 are still connected to each other, then the system would be divided into two groups or subsets. If one of the group of 7 was then separated from the other 6 (the 6 remaining connected to each other), then the system would now have 3 subsets of size 1, 3 and 6. If connections are re-established, the subsets may again be redefined. For example if the single device was to re-establish the connection to the group of three, then there would now be two groups of size 4 and 6.

Figure 7:
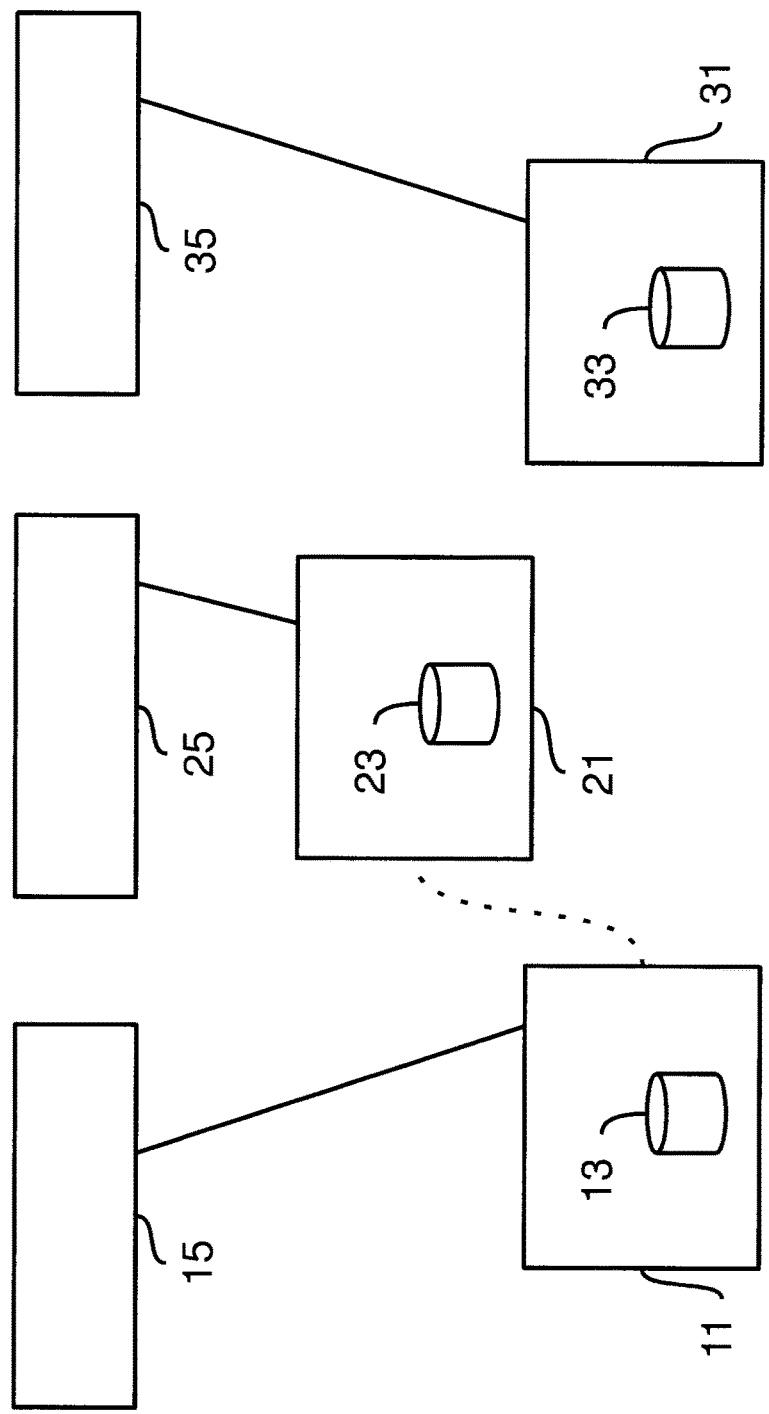
FIGS. 7 to 9 provide further illustrations of the embodiment of FIG. 6 in different situations.
Figure 8:
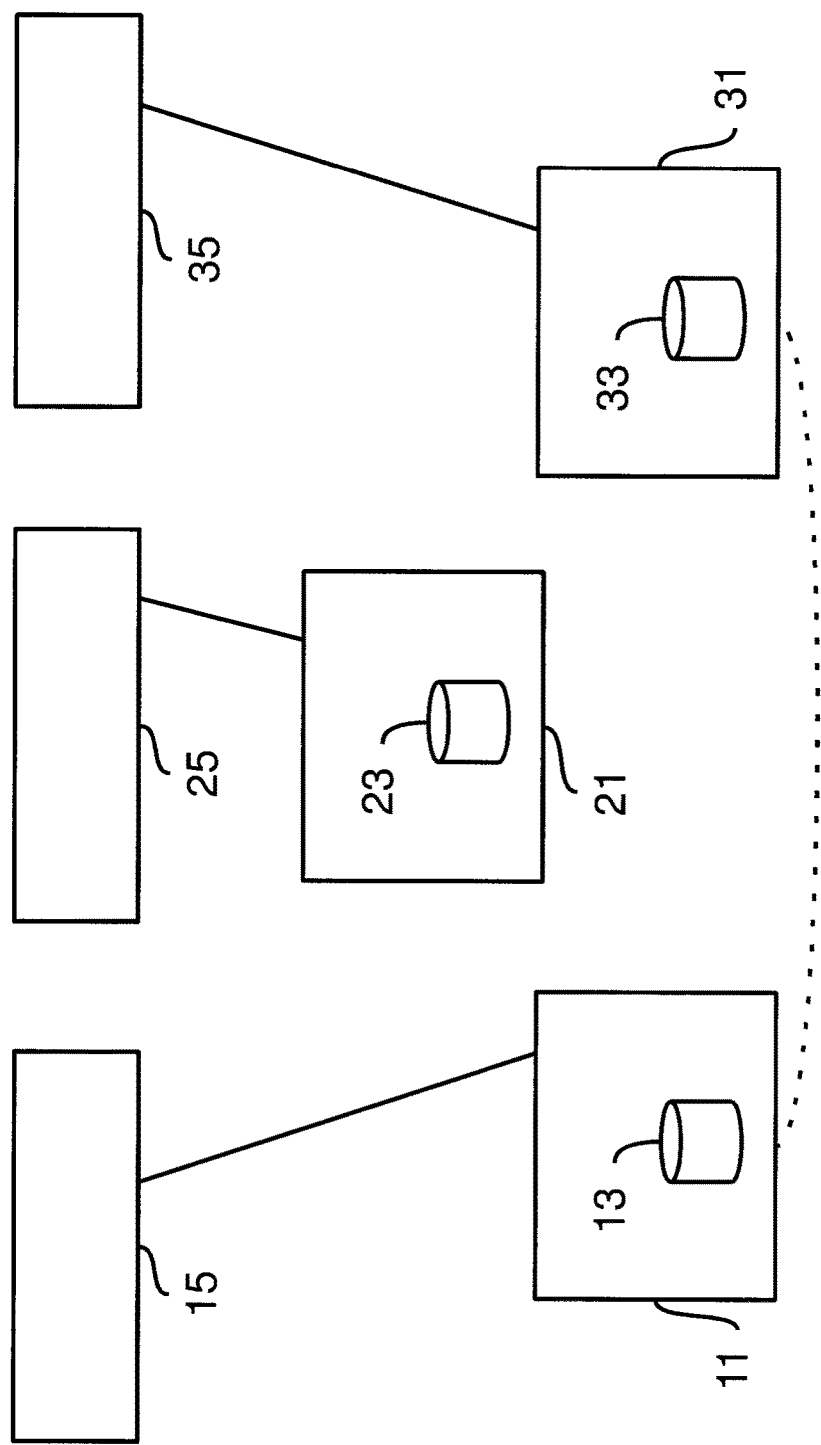
Figure 9:
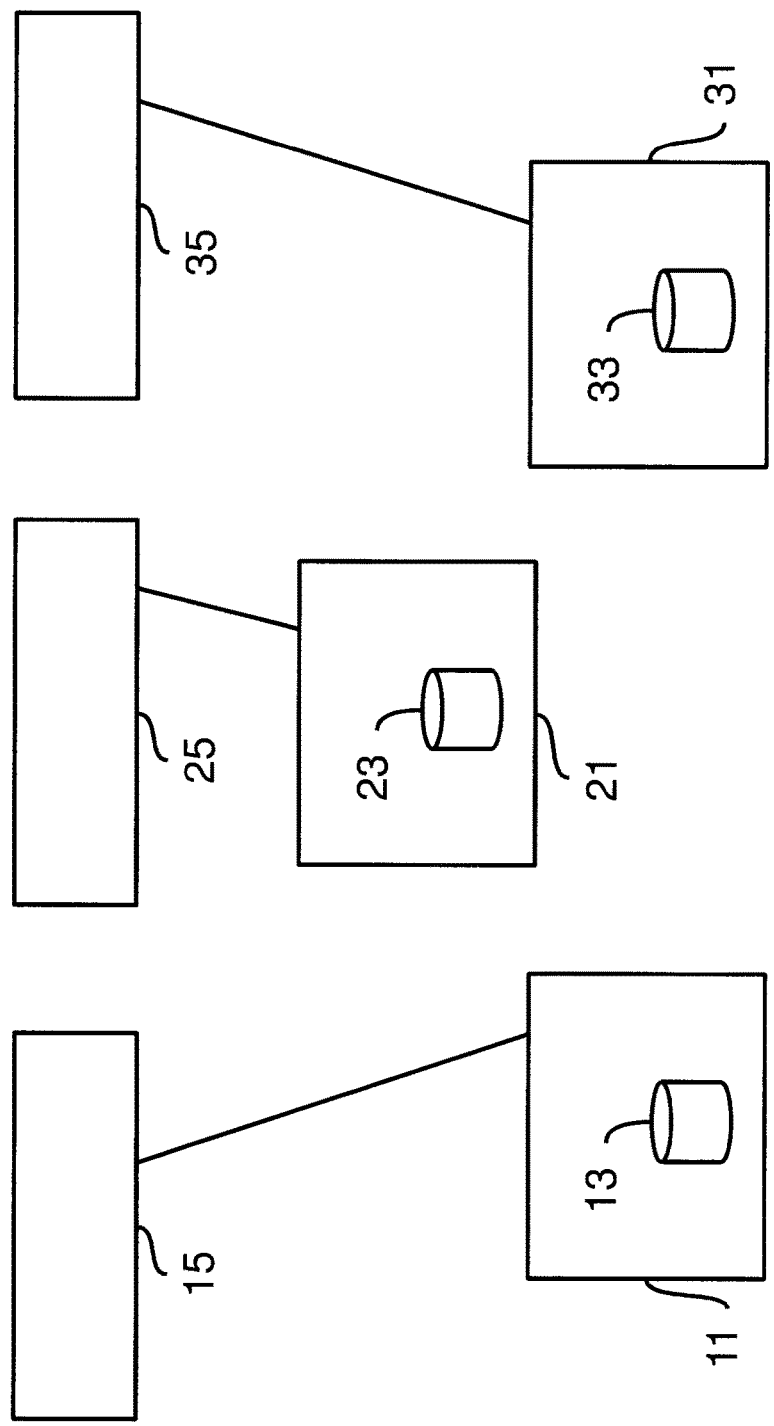

In FIG. 6, devices 11, 21, 31 are connected over a network. The devices therefore all belong to the same subset of the plurality (in this case, an 'improper' subset, since it contains all the devices of the plurality). In FIGS. 7-9, one or more of the devices is shown as disconnected from the other devices, meaning that there are multiple subsets in the plurality of devices.

As in the previous examples, each of the token stores 13, 23, 33 in FIGS. 6-9 has a minimum value of 0 tokens and a maximum value of 10 tokens. In this example, the total number of tokens between token stores in a subset will increase at a rate M of 1 token per second if the subset includes more than half the devices in the plurality of devices, stopping if it reaches the maximum total value of tokens for the subset. The total number of tokens between token stores in a subset will decrease at a rate N of 2 tokens per second if the subset includes half or fewer than half of the devices in the plurality of devices, down to the minimum total value of tokens for the subset.

As in previous examples, each of the devices 11, 21, 31 enables its respective resource 15, 25, 35 when the number of tokens in its respective token store 13, 23, 33 is greater than the minimum value of 0 tokens and disables the respective resource when the number of tokens in the respective token store is not greater than 0 tokens.

At time t=0 (illustrated in FIG. 6), devices 11, 21, 31 are connected over a network, meaning that all the devices in the plurality belong to one improper subset. Each token store 13, 23, 33 contains the maximum of 10 tokens at time t=0. There are therefore 30 tokens in total in the (improper) subset including all three devices. The system continues in this state until time t=10, at which point device 31 becomes disconnected from the other devices (as illustrated in FIG. 7). FIG. 10 illustrates the numbers of tokens in token stores 13, 23, 33 over the time period t=0 to t=23.

Between time t=10 and time t=14, device 31 remains disconnected from the other devices in the plurality. Therefore, for that period of time, devices 11 and 21 belong to a subset including more than half the devices in the plurality, while device 31 belongs to a subset including fewer than half the devices in the plurality. Therefore, the total number of tokens in the subset including devices 11 and 21 remains at the maximum value of 20 for the subset, i.e. each of the token stores 13, 23 remains at its maximum value of 10. The total number of tokens in the subset including only device 31 decreases at a rate N of 2 tokens each second, i.e. the number of tokens in token store 33 decreases by 2 tokens each second, reducing from 10 tokens to 2 tokens between time t=10 and time t=14, as illustrated in FIG. 10.

At time t=14, the connection between devices 11 and 21 is severed, but a connection is established between devices 11 and 31. Therefore, from time t=14 onwards, devices 11 and 31 belong to a subset including more than half the devices in the plurality of devices, and device 21 belongs to a subset including only one device (as illustrated in FIG. 8).

Between time t=14 and time t=18, device 21 remains disconnected from the other devices in the plurality. Therefore, for that period of time, devices 11 and 31 belong to a subset including more than half the devices in the plurality, while device 21 belongs to a subset including fewer than half the devices in the plurality. Therefore, the total number of tokens in the subset including devices 11 and 31, increases at a rate M of 1 token per second. Because token store 13 already contains the maximum value of 10 tokens at time t=14, token store 33 receives the 1 token per second. The total number of tokens in the subset including only device 21 decreases at a rate N of 2 tokens per second, i.e. the number of tokens in token store 23 decreases by 2 tokens each second, reducing from 10 tokens to 2 tokens between time t=14 and time t=18, as illustrated in FIG. 10.

At time t=18, the connection between devices 11 and 31 is severed, so that each device is in its own subset. Therefore, from time t=18 onwards, each subset includes fewer than half the devices in the plurality. The total number of tokens in each subset decreases at a rate N of 2 tokens per second, i.e. the number of tokens in each token store 13, 23, 33 decreases by 2 tokens every second, as illustrated in FIG. 10. Consequently at time t=19, the tokens in token store 23 are depleted, and resource 25 is disabled. Similarly, at time t=21, the tokens in token store 33 are depleted, and resource 35 is disabled. At time t=23, the tokens in token store 13 are depleted, and resource 15 is disabled.

If, at some later time, connections were established between devices 11, 21 and 31 so that some or all of the devices in the plurality belonged to one subset which included more than half the devices, the total number of tokens in the subset would increase at a rate of M tokens per unit time.

How the M tokens per unit time would, in this embodiment, be distributed between token stores 13, 23, 33 is determined by one of the devices in the subset, acting as a 'lead' device for the subset. The 'lead' device could apportion the tokens according to one of numerous possible schemes.

For instance, the 'lead' device could apportion the tokens in rotation, so that token store 13 receives a first M tokens, token store 23 receives the next M tokens, token store 33 receives the following M tokens, etc.

Alternatively, the 'lead' device could apportion the tokens equally in each unit of time, such as by apportioning M/3 tokens to token store 13, M/3 tokens to token store 23 and M/3 tokens to token store 33 in each unit of time.

As a further alternative, the 'lead' device could apportion the tokens to token store 13 until it reaches its maximum value, then apportion tokens to token store 23 until it reaches its maximum value, and then apportion tokens to token store 33 until it reaches its maximum value.

Another alternative would be to apportion tokens to the token stores according to priorities of the devices. If, for example, device 21 were of the highest priority, device 11 were of the next highest priority, and device 31 were of the lowest priority, the tokens could be apportioned to the token stores in that order until each had filled its token store.

In other instances, tokens may be apportioned to the token stores according to the numbers of tokens already in the token stores. For instance, tokens may be apportioned preferentially to the token store(s) having the fewest tokens, or those with numbers of tokens close to their maximum numbers of tokens. The devices in the subset may therefore exchange information over the network about the numbers of tokens in their respective token stores to enable such apportioning.

In some examples, there may not be 'lead' devices for the subsets. The devices may instead distribute tokens among themselves by comparing the number of tokens in their own token stores with the numbers of tokens in the token stores of their neighbouring devices in the network. If a device determines that there are more tokens in its token store than there are in the token store of a neighbouring device, the device may cause the number of tokens in its token store to decrease and the number of tokens in the token store of the neighbouring device to increase, for example.

In some examples, a device may still enable its respective resource when the number of tokens in its associated token store is not greater than the token store's minimum value, if the number of tokens in the associated token store of a neighbouring device in the same subset is greater than that token store's minimum value. For example, if token store 13 is depleted of tokens but token store 23 (which is in the same subset) still has more than the minimum number of tokens, the devices 11 and 21 will both enable their respective resources 15, 25. This configuration may help the system continue enabling the greatest number of resources for the longest period of time.

Similar considerations apply to depletion of token stores when a subset of devices including half or fewer than half of the devices in the plurality contains multiple devices. The tokens may be depleted in rotation, according to priority, or according to one of the other schemes discussed above, for example.

Figure 11:
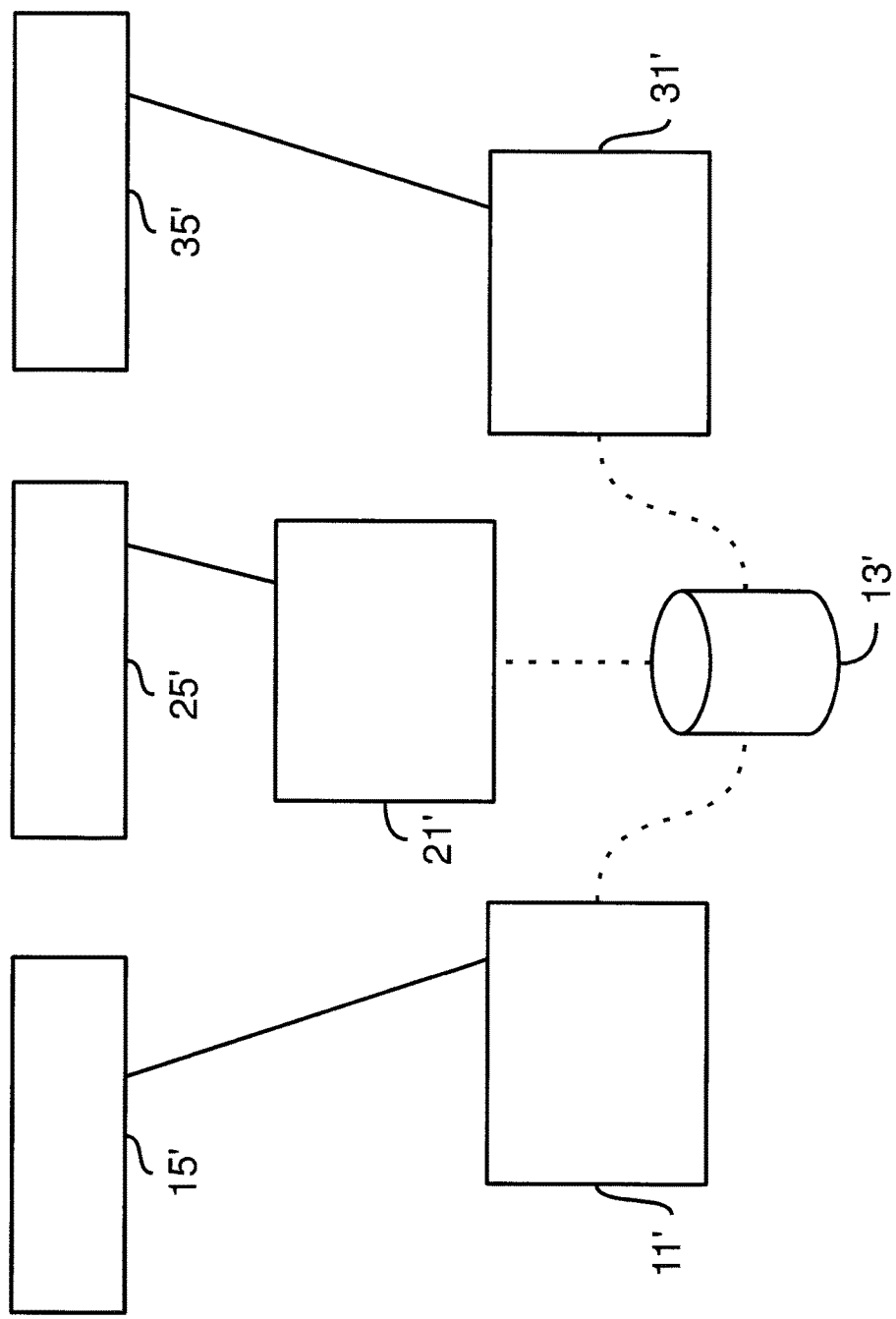
FIG. 11 illustrates an embodiment of a system for controlling enablement of resources using a collective token store.

FIG. 11 illustrates a variant of the system in FIG. 9. In FIG. 11, a single token store 13' functions as a collective token store associated with a subset of devices including devices 11', 21', 31'. In this embodiment, the collective token store may be stored in software at one of the devices, or on external physical storage means, or at another location. The devices in the subset enable their respective resources until the number of tokens in the collective token store reaches the minimum value for the collective token store.

The arrangement of FIG. 4 in which a device 1 connects to an authorisation source 7 provided at a server 9 (rather than a USB drive 8) can also be applied to the systems illustrated in some of the other figures. For example, in the arrangement of FIG. 2, device 1 may establish an exclusive connection to an authorisation source provided at a server, and that exclusive connection may be severed when device 2 connects to the same authorisation source provided at the server.

The rates M and N of token increase and decrease for a given device's token store may change. The change may depend on, for example: a number of resources being enabled by that device; the number of tokens currently in the token store; a number of other devices within the system; and/or other parameters such as a change at the authorisation source or a change in the number of authorisation sources available within a network. The change to the rates M and N may be caused automatically by the system or may be caused by input from a controller of the system.

In the examples above, the rates have been described in terms of the number of tokens per second but the period between the tokens being added or removed may be any suitable period and the rates applied accordingly. The periods and rates will depend on a number of factors, such as the application and the risk of abuse. In some cases, a long grace period may be required (e.g. several hours or days) whereas in other cases, only fractions of seconds may be required.

The minimum and maximum values of a given device's token store may also change. For example, a given device may only be intended to allow a certain period of enablement while there is no exclusive connection to an authorisation source. The maximum value of the token store and rate N of decrease may therefore have been set so that the device can only continue enablement of a resource for the period while there is no exclusive connection to an authorisation source. A change in, for example, the value of N may therefore require a change in the maximum value of the token store.

The authorisation source may additionally prevent an exclusive connection from being established when a device is attempting to enable more than a certain number of resources simultaneously. To this end, the authorisation source may be able to cause a change in one or more of the rates N, M and the maximum and minimum values of token stores.

Although some of the above examples describe an authorisation source provided on a USB drive, the authorisation source could be provided on any other physical device (e.g. storage means) which can be connected to a control device, such as a hard disk drive, a solid state drive, a compact disc, an EEPROM, a digital versatile disc, or any other suitable storage means.

Similarly, some of the other examples describe an authorisation source provided on a server. The server could be any kind of device which can provide an authorisation source to another device—using a network or another means of connection between devices.

The authorisation source is arranged in such a way that it cannot be easily duplicated and cannot be easily modified. The authorisation source may, for instance, be a read-only file stored on physical storage means. There may be one or more forms of protection limiting access to the authorisation source, such as username and/or password protection, encryption, time-limited access restrictions, or any other suitable methods of protection. For example, for a USB based authorisation source, cryptographic protection may be used to control access to prevent fraudulent access, use, modification and/or copying. Cloud type authorisation sources such as Amazon S3 can utilise a locking mechanism to ensure unique access to an object.

The word 'token' does not imply the existence of a physical token or other physical object. The effect of the 'tokens' could be implemented using, for example, counters, accumulators or other entities implemented in software which are incremented or decremented according to a criterion.

The 'tokens' and token stores described in the systems above provide the advantage of a grace period when a resource can be enabled even when an authorisation source is not available to the enabling device, i.e. there is no exclusive connection from the device to an authorisation source. However, the token stores also prevent exploitation of this 'grace period' by ensuring that the overall number of tokens in a system decreases over time if there is not an appropriate number of authorisation sources for control devices.

In some embodiments, the token stores may also be provided on removable storage means. In these embodiments, the storage means may be connected to different devices to provide the functionality of the token stores at those devices. This arrangement allows a user to easily change which device performs a resource enabling function by connecting the physical storage means providing the token store functionality to a different device. Such physical storage means may additionally provide the authorisation source functionality discussed above by appropriate partitioning of the physical storage means.

The systems can be used to control various types of hardware and software resources, such as electronic door locks, electronic tools, factory machinery, computer hardware, mobile devices, software applications, firmware, etc.

What is claimed is:

1. A system for controlling enablement of one or more resources, comprising:
   at least one control device operable to enable and disable one or more hardware, software, or machine resources; and
   at least one memory accessible by the control device, the at least one memory including at least one token store for storing a number of tokens, wherein the number of tokens in the at least one token store can range between a minimum value and a maximum value; and wherein:

the number of tokens in the token store increases over time, up to the maximum value, while a criterion is satisfied, the criterion being satisfied when: there is an exclusive connection to an authorization source from the at least one control device; or the at least one control device is one of a plurality of control devices and the at least one control device belongs to a subset of the plurality of control devices including more than half of the control devices in the plurality of control devices;

the number of tokens in the token store decreases over time, down to the minimum value, while the criterion is not satisfied, the criterion being not satisfied when: there is no exclusive connection to an authorization source from the at least one control device; or the at least one control device is one of a plurality of control devices and the at least one control device belongs to a subset of the plurality of control devices including half or fewer than half of the control devices in the plurality of control devices;

the at least one control device is arranged to determine whether the number of tokens in the token store is greater than the minimum value; and the at least one control device is arranged to enable the one or more hardware, software, or machine resources if it is determined that the number of tokens in the at least, one token store is greater than the minimum value and to disable the one or more resources if it is determined that the number of tokens in the at least one token store is not greater than the minimum value.

2. A system as claimed in claim 1, wherein the number of tokens in the token store increases at a rate of M tokens per unit time while the criterion is satisfied, the number of tokens in the token store decreases at a rate of N tokens per unit time while the criterion is not satisfied, and the rate N is greater in magnitude than the rate M.

3. A system as claimed in claim 1, wherein the authorization source is provided on at least one of: a physical storage means which can be physically connected to the control device, and a server to which the control device can connect over a network.

4. A system as claimed in claim 1, wherein the system comprises a plurality of control devices.

5. A system as claimed in claim 4, wherein, at any given time, the plurality of control devices is selectively divided into one or more subsets, each subset including at least one device.

6. A system as claimed in claim 5, wherein the at least one token store is a collective token store associated with one of the one or more subsets and each control device in the subset is arranged to enable a respective resource when the number of tokens in the collective token store is greater than the minimum value and not to enable the respective resource when the number of tokens in the collective token store is not greater than the minimum value.

7. A system as claimed in claim 5, wherein each control device has an associated token store and each control device is arranged to enable a respective resource when the number of tokens in the control device's associated token store is greater than the token store's minimum value and not to enable the respective resource when the number of tokens in the control device's associated token store is not greater than the token store's minimum value.

8. A system as claimed in claim 7, wherein each control device is arranged to enable the respective resource when the number of tokens in an associated token store is not greater than the minimum value but the number of tokens in a token store associated with another device in the same subset is greater than the minimum value for that other token store.

9. A system as claimed in claim 5, wherein the control devices in a subset are connected to one another but not to control devices in other subsets.

10. A method for controlling enablement of one or more resources, comprising:

providing at least one control device and at least one token store, for storing a number of tokens, wherein the number of tokens in the token store can range between a minimum value and a maximum value;

increasing the number of tokens in the at least one token store over time, up to the maximum value for the at least one token store, while a criterion is satisfied, the criterion being satisfied when: there is an exclusive connection to an authorization source from the at least one control device; or the at least one control device is one of a plurality of control devices and the at least one control device belongs to a subset of the plurality of control devices including more than half of the control devices in the plurality of control devices;

decreasing the number of tokens in the at least one token store over time, down to the minimum value, while the criterion is not satisfied, the criterion being not satisfied when: there is no exclusive connection to an authorization source from the at least one control device; or the at least one control device is one of a plurality of control devices and the at least one control device belongs to a subset of the plurality of control devices including half or fewer than half of the control devices in the plurality of control devices;

determining, by the at least one control device, whether the number of tokens in the at least one token store is greater than the minimum value; and enabling, by the at least one control device, one or more hardware, software, or machine resources if it is determined that the number of tokens in the at least one token store is greater than the minimum value and disabling, by the at least one control device, the one or more hardware, software, or machine resources if it is determined that the number of tokens in the at least one token store is not greater than the minimum value.

11. A method as claimed in claim 10, comprising:

increasing the number of tokens in the token store at a rate of M tokens per unit time while the criterion is satisfied, and decreasing the number of tokens in the token store at a rate of N tokens per unit time while the criterion is not satisfied, wherein the rate N is greater in magnitude than the rate M.

12. A method as claimed in claim 10, comprising connecting to the authorization source, the authorization source being provided on at least one of: a physical storage means which can be physically connected to the at least one control device, and a server to which the at least one control device can connect over a network.

13. A method comprising a plurality of instances of the method as claimed in claim 10, wherein the at least one control device is one of a plurality of control devices for controlling multiple resources and each instance is operated on a control device from among the plurality of control devices.

14. A method as claimed in claim 13, comprising the plurality of control devices being selectively divided into one or more subsets, each subset including at least one control device.

15. A method as claimed in claim 14, wherein the at least one token store is a collective token store associated with one of the one or more subsets, and wherein each control device in the subset enables a respective resource when the number of tokens in the collective token store is greater than the minimum value and does not enable the respective resource when the number of tokens in the collective token store is not greater than the minimum value.

16. A method as claimed in claim 14, wherein each control device has an associated token store and each control device enables a respective resource when the number of tokens in the control device's associated token store is greater than the token store's minimum value and does not enable the respective resource when the number of tokens in the control device's associated token store is not greater than the token store's minimum value.

17. A method as claimed in claim 16, wherein each control device enables the respective resource when the number of tokens in said control device's associated token store is not greater than the minimum value but the number of tokens in a token store associated with another control device in the same subset is greater than the minimum value for that other token store.

18. A method as claimed in claim 14, wherein the control devices in a subset are connected to one another but not to control devices in other subsets.

19. A resource enablement controller program, for controlling enablement of one or more hardware, software, or machine resources, stored in a computer-readable storage device, executable in a processor of a control device and which when executed, causes the processor to operate so as to:
increase, over time, the number of tokens in a token store for storing a number of tokens, wherein the number of tokens in the token store can range between a minimum value and a maximum value, up to the maximum value for the token store, while a criterion is satisfied, the criterion being satisfied when: there is an exclusive connection to an authorization source from the control device; or the control device is one of a plurality of control devices and the control device belongs to a subset of the plurality of control devices including more than half of the control devices in the plurality of control devices; and
decrease the number of tokens in the token store over time, down to the minimum value, while the criterion is not satisfied, the criterion being not satisfied when: there is no exclusive connection to an authorization source from the at least one control device; or the at least one control device is one of a plurality of control devices and the at least one control device belongs to a subset of the plurality of control devices including half or fewer than half of the control devices in the plurality of control devices;
determine whether the number of tokens in the token store is greater than the minimum value; and
enable the one or more hardware, software, or machine resources if it is determined that the number of tokens in the at least one token store is greater than the minimum value and to disable the one or more resources if it is determined that the number of tokens in the at least one token store is not greater than the minimum value.

* * * * *